(12) United States Patent
Levi et al.

(10) Patent No.: US 11,757,614 B2
(45) Date of Patent: Sep. 12, 2023

(54) ACCURATE TIMESTAMP CORRECTION

(71) Applicant: MELLANOX TECHNOLOGIES, LTD., Yokneam (IL)

(72) Inventors: Dotan David Levi, Kiryat Motzkin (IL); Wojciech Wasko, Młynek (PL); Natan Manevich, Ramat Hasharon (IL); Teferet Geula, Ma'ale Adumim (IL); Amit Mandelbaum, Teqoa (IL); Ariel Almog, Kohav Yair (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 263 days.

(21) Appl. No.: 17/315,396

(22) Filed: May 10, 2021

(65) Prior Publication Data
US 2022/0360423 A1    Nov. 10, 2022

(51) Int. Cl.
*H04L 7/00* (2006.01)
*G06N 20/00* (2019.01)
*H04L 43/106* (2022.01)

(52) U.S. Cl.
CPC .......... *H04L 7/0054* (2013.01); *G06N 20/00* (2019.01); *H04L 43/106* (2013.01)

(58) Field of Classification Search
CPC ........ B60W 60/00272; B60W 60/0011; H04L 7/00; H04L 12/26; G06N 20/00; G06F 30/20; G06F 9/54
See application file for complete search history.

(56) References Cited

U.S. PATENT DOCUMENTS

| 11,416,749 | B2* | 8/2022 | Bshara | G06F 9/542 |
| 2017/0250882 | A1* | 8/2017 | Kellicker | H04L 67/535 |
| 2021/0243797 | A1* | 8/2021 | Reddy | H04W 24/02 |

OTHER PUBLICATIONS

Levi et al., U.S. Appl. No. 17/120,313, filed Dec. 14, 2020.
IEEE Std 1588™-2008, "IEEE Standard for a Precision Clock Synchronization Protocol for Networked Measurement and Control Systems", pp. 1-289, Jul. 24, 2008.

* cited by examiner

*Primary Examiner* — Iqbal Zaidi
(74) *Attorney, Agent, or Firm* — KLIGLER & ASSOCIATES PATENT ATTORNEYS LTD

(57) ABSTRACT

In one embodiment, a processing apparatus includes processing circuitry to process an event, a timestamping unit to generate a timestamp for the event, at least one register to store at least one parameter describing a hardware state of the processing circuitry, and timestamp correction processing circuitry to compute a time value as a correction to the generated timestamp responsively to the at least one parameter.

35 Claims, 8 Drawing Sheets

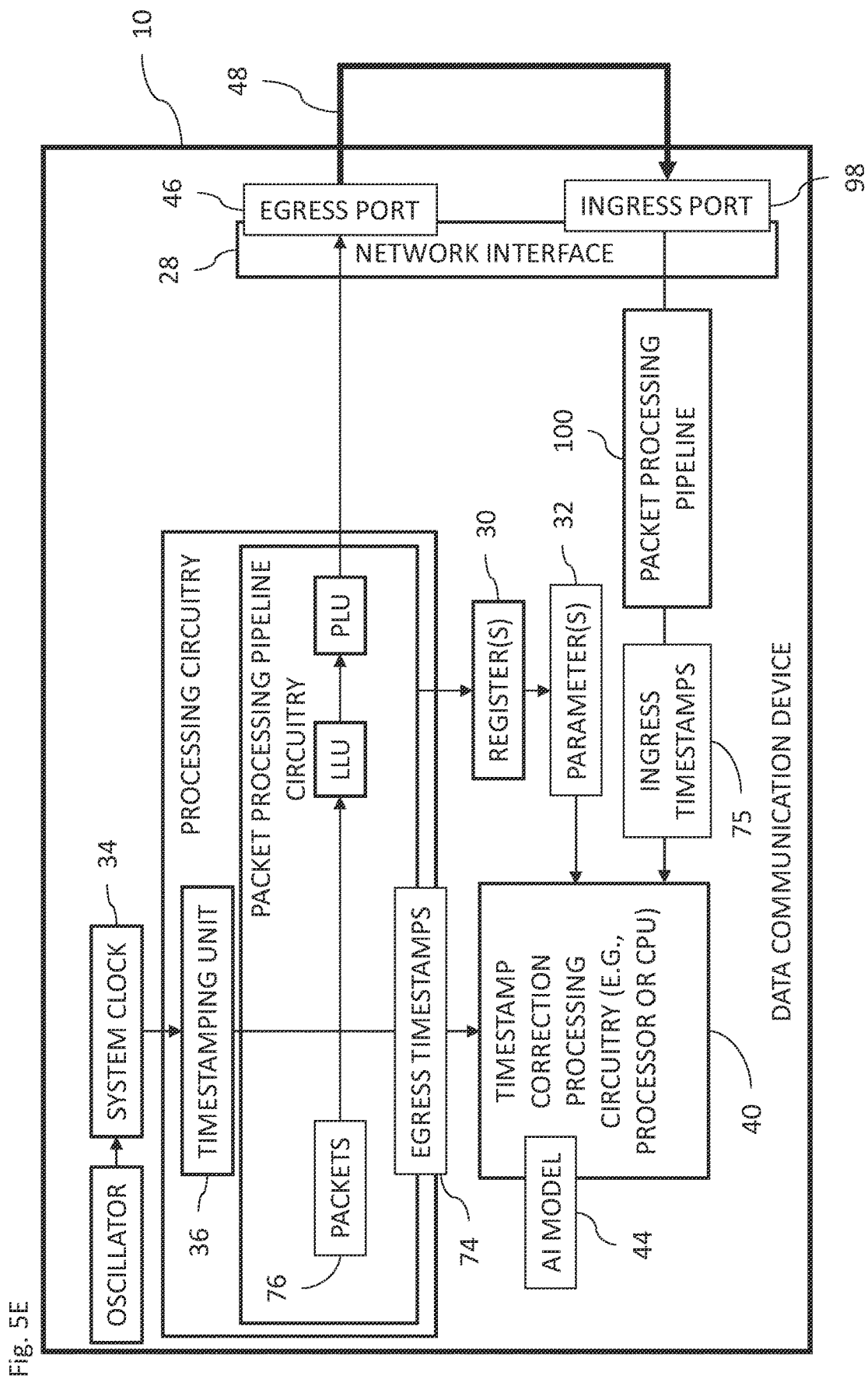

ACCURATE TIMESTAMP CORRECTION

STATEMENT REGARDING SPONSORED RESEARCH OR DEVELOPMENT

The project leading to this application has received funding from the European Union's Horizon 2020 research and innovation program under grant agreement No 957403.

FIELD OF THE INVENTION

The present invention relates to computer systems, and in particular, but not exclusively to, timestamps.

BACKGROUND

Many applications, such as networking applications, rely on timestamping information (e.g., packet timestamping information provided by network interfaces) to indicate the timing of events. However, often the event of interest is not timestamped exactly when it occurs, but instead, the timestamp is generated "close" to the event, thus incurring some uncertainty as to when the event occurred. For example, it very difficult, if not impossible, to generate event timestamps in a network interface controller (NIC) with an accuracy of a few nanoseconds. This may be due to the number of software entities involved, running in a virtualized environment, and/or high network speeds, e.g., 25 giga bits per second, and above.

In a NIC, one solution to improve event timestamp accuracy is to generate the timestamp as close as possible to the timing of the event of interest, in a place in the packet processing pipeline from which information can still be propagated back to software running in the NIC. Even so, different hardware optimizations as well as buffering and arbitration delays can extend or shorten the delay between generation of the timestamp and the actual event, causing jitter, thereby making the event timestamp unreliable. For example, for a time synchronization packet, the desired event is the time of egress of the packet onto the wire, and the timestamp is generated a few arbitration decisions and processing steps, which incorporate buffering, prior to the packet egress.

SUMMARY

There is provided in accordance with an embodiment of the present disclosure, a processing apparatus, including processing circuitry to process an event, a timestamping unit to generate a timestamp for the event, at least one register to store at least one parameter describing a hardware state of the processing circuitry, and timestamp correction processing circuitry to compute a time value as a correction to the generated timestamp responsively to the at least one parameter.

Further in accordance with an embodiment of the present disclosure the hardware state of the processing circuitry is a hardware state of the processing circuitry around processing of the event.

Still further in accordance with an embodiment of the present disclosure the hardware state of the processing circuitry is a hardware state of the processing circuitry during processing of the event.

Additionally in accordance with an embodiment of the present disclosure, the apparatus includes a network interface to send data packets to, and receive data packets from a packet network, and wherein the processing circuitry includes packet processing pipeline circuitry to process a data packet, the timestamping unit is configured to generate the timestamp for the data packet, and the at least one parameter is at least one packet processing pipeline parameter describing a state of the packet processing pipeline circuitry, and the timestamp correction processing circuitry is configured to compute the time value as the correction to the generated timestamp responsively to the at least one packet processing pipeline parameter.

Moreover, in accordance with an embodiment of the present disclosure the packet processing pipeline circuitry is configured to process egress of the data packet from the apparatus.

Further in accordance with an embodiment of the present disclosure the at least one packet processing pipeline parameter includes any one or more of the following an occupancy of a queue, a size of a queue, average packet size, number of idle cycles, a number of credits from a host bus, a number of pause frames from the network, or a link speed.

Still further in accordance with an embodiment of the present disclosure the packet processing pipeline circuitry includes a link layer unit and a physical layer unit, the at least one packet processing pipeline parameter describing a state of at least one of the link layer unit, or the physical layer unit.

Additionally, in accordance with an embodiment of the present disclosure the data packet is a clock synchronization packet.

Moreover, in accordance with an embodiment of the present disclosure the timestamp correction processing circuitry is configured to find an estimated time difference between the generation of the timestamp and an actual time of the event responsively to the at least one parameter.

Further in accordance with an embodiment of the present disclosure the timestamp correction processing circuitry is configured to compute the time value as an adjusted timestamp responsively to the estimated time difference and the generated timestamp.

Still further in accordance with an embodiment of the present disclosure the time value is equal to the estimated time difference.

Additionally, in accordance with an embodiment of the present disclosure the timestamp correction processing circuitry is configured to apply an artificial intelligence model to the at least one parameter to yield the time value.

Moreover, in accordance with an embodiment of the present disclosure the artificial intelligence model includes any one or more of the following a decision tree, a random forest, linear regression, or a neural network.

Further in accordance with an embodiment of the present disclosure, the apparatus includes a processor to train the artificial intelligence model responsively to respective values of the at least one parameter and corresponding measured time differences between the generation of respective timestamps and respective estimated times of respective events.

Still further in accordance with an embodiment of the present disclosure, the apparatus includes a network interface to send data packets to, and receive data packets from, a packet network, the network interface including a port configured as an egress port, and a cable configured to connect the egress port to a time measuring device so that the respective packets leave the egress port and enter the time measuring device via the cable, and wherein the respective events are respective data packets leaving the egress port, and the processor is configured to find the measured time differences between the generation of respective timestamps and the respective estimated times of the respective events responsively to respective egress timestamps of the respective data packets leaving the egress port, respective ingress timestamps of the respective data packets entering the time measuring device, and a time delay in the cable.

Additionally, in accordance with an embodiment of the present disclosure, the apparatus includes a system clock, and wherein the processing circuitry is configured to process a clock synchronization between the system clock and a clock of the time measuring device.

Moreover, in accordance with an embodiment of the present disclosure the processing circuitry is configured to synchronize the system clock directly from an output of an oscillator of the time measuring device.

Further in accordance with an embodiment of the present disclosure, the apparatus includes an oscillator, wherein the processing circuitry is configured to provide an output of the oscillator to the time measuring device to synchronize the clock of the time measuring device to the system clock.

Still further in accordance with an embodiment of the present disclosure the processing circuitry is configured to process the clock synchronization responsively to applying a clock synchronization protocol between the apparatus and the time measuring device.

Additionally, in accordance with an embodiment of the present disclosure the processing circuitry is configured to process the clock synchronization responsively to a phase-locked-loop, which is configured to track a PPS output of the system clock or the clock of the time measuring device.

Moreover in accordance with an embodiment of the present disclosure, the apparatus includes a system clock, and wherein the network interface includes another port configured as an ingress port, the cable is configured to connect the egress port to the ingress port so that the respective packets leave the egress port and enter the ingress port via the cable, and the timestamping unit is configured to generate the respective egress timestamps and respective ingress timestamps responsively to respective values of the system clock.

There is also provided in accordance with another embodiment of the present disclosure, a processing apparatus, including a processor to train an artificial intelligence model to compute a time value as a correction to a timestamp generated for an event, which is being processed by processing circuitry, responsively to at least one parameter describing a hardware state of the processing circuitry.

Further in accordance with an embodiment of the present disclosure the hardware state of the processing circuitry is a hardware state of the processing circuitry around processing of the event.

Still further in accordance with an embodiment of the present disclosure the hardware state of the processing circuitry is a hardware state of the processing circuitry during processing of the event.

Additionally, in accordance with an embodiment of the present disclosure the at least one parameter is at least one packet processing pipeline parameter.

Moreover, in accordance with an embodiment of the present disclosure the at least one packet processing pipeline parameter includes any one or more of the following an occupancy of a queue, a size of a queue, average packet size, number of idle cycles, a number of credits from a host bus, a number of pause frames from the network, or a link speed.

Further in accordance with an embodiment of the present disclosure the at least one packet processing pipeline parameter describing a state of at least one of a link layer unit or a physical layer unit of a packet processing pipeline.

Still further in accordance with an embodiment of the present disclosure the processor is configured to train the artificial intelligence model to compute the time value as an estimated time difference between the generation of the timestamp and an actual time of the event responsively to the at least one parameter.

Additionally, in accordance with an embodiment of the present disclosure the processor is configured to train the artificial intelligence model to compute the time value as an adjusted timestamp responsively to the at least one parameter.

Moreover, in accordance with an embodiment of the present disclosure the artificial intelligence model includes any one or more of the following a decision tree, a random forest, linear regression, or a neural network.

Further in accordance with an embodiment of the present disclosure the processor is configured to train the artificial intelligence model responsively to respective values of the at least one parameter and corresponding measured time differences between the generation of respective timestamps and respective estimated times of respective events.

Still further in accordance with an embodiment of the present disclosure, the apparatus includes a network interface to send data packets to, and receive data packets from, a packet network, the network interface including a port configured as an egress port, and a cable configured to connect the egress port to a time measuring device so that the respective packets leave the egress port and enter the time measuring device via the cable, and wherein the respective events are respective data packets leaving the egress port, and the processor is configured to train the artificial intelligence model responsively to respective values of the at least one parameter, respective egress timestamps of the respective data packets leaving the egress port, respective ingress timestamps of the respective data packets entering the time measuring device, and a time delay in the cable.

Additionally, in accordance with an embodiment of the present disclosure, the apparatus includes a system clock, and the processing circuitry, which is configured to process a clock synchronization between the system clock and a clock of the time measuring device.

Moreover, in accordance with an embodiment of the present disclosure the processing circuitry is configured to synchronize the system clock directly from an output of an oscillator of the time measuring device.

Further in accordance with an embodiment of the present disclosure, the apparatus includes an oscillator, wherein the processing circuitry is configured to provide an output of the oscillator to the time measuring device to synchronize the clock of the time measuring device to the system clock.

Still further in accordance with an embodiment of the present disclosure the processing circuitry is configured to process the clock synchronization responsively to applying a clock synchronization protocol between the apparatus and the time measuring device.

Additionally, in accordance with an embodiment of the present disclosure the processing circuitry is configured to process the clock synchronization responsively to a phase-locked-loop, which is configured to track a PPS output of the system clock or the clock of the time measuring device.

Moreover in accordance with an embodiment of the present disclosure, the apparatus includes a system clock and a timestamping unit, and wherein the network interface includes another port configured as an ingress port, the cable is configured to connect the egress port to the ingress port so that the respective packets leave the egress port and enter the ingress port via the cable, and the timestamping unit is configured to generate the respective egress timestamps and respective ingress timestamps responsively to respective values of the system clock.

There is also provided in accordance with still another embodiment of the present disclosure, a processing apparatus, including a processor to use a trained artificial intelligence model to compute a time value as a correction to a timestamp generated for an event, which is being processed by processing circuitry, responsively to at least one parameter describing a hardware state of the processing circuitry.

Further in accordance with an embodiment of the present disclosure the hardware state of the processing circuitry is a hardware state of the processing circuitry around processing of the event.

Still further in accordance with an embodiment of the present disclosure the hardware state of the processing circuitry is a hardware state of the processing circuitry during processing of the event.

Additionally in accordance with an embodiment of the present disclosure, the apparatus includes a network interface to send data packets to, and receive data packets from a packet network, the processing circuitry, which includes packet processing pipeline circuitry to process a data packet, a timestamping unit to generate the timestamp for the data packet, and wherein the at least one parameter is at least one packet processing pipeline parameter describing a state of the packet processing pipeline circuitry, and the processor is configured to use the trained artificial intelligence model to compute the time value as the correction to the generated timestamp responsively to the at least one packet processing pipeline parameter.

Moreover, in accordance with an embodiment of the present disclosure the packet processing pipeline circuitry is configured to process egress of the data packet from the apparatus.

Further in accordance with an embodiment of the present disclosure the at least one packet processing pipeline parameter includes any one or more of the following an occupancy of a queue, a size of a queue, average packet size, number of idle cycles, a number of credits from a host bus, a number of pause frames from the network, or a link speed.

Still further in accordance with an embodiment of the present disclosure the packet processing pipeline circuitry includes a link layer unit and a physical layer unit, the at least one packet processing pipeline parameter describing a state of at least one of the link layer unit, or the physical layer unit.

Additionally, in accordance with an embodiment of the present disclosure the data packet is a clock synchronization packet.

Moreover, in accordance with an embodiment of the present disclosure the processor is configured to use the artificial intelligence model to compute the time value as an estimated time difference between the generation of the timestamp and an actual time of the event responsively to the at least one parameter.

Further in accordance with an embodiment of the present disclosure the processor is configured to use the artificial intelligence model to compute the time value as an adjusted timestamp responsively to the at least one parameter.

Still further in accordance with an embodiment of the present disclosure the artificial intelligence model includes any one or more of the following a decision tree, a random forest, linear regression, or a neural network.

There is also provided in accordance with still another embodiment of the present disclosure a method, including processing an event, generating a timestamp for the event, storing at least one parameter describing a hardware state, and computing a time value as a correction to the generated timestamp responsively to the at least one parameter.

BRIEF DESCRIPTION OF THE DRAWINGS

The present invention will be understood from the following detailed description, taken in conjunction with the drawings in which:

FIGS. 5A-E are alternative views of the data communication device of FIG. 1 configured to produce training data for the artificial intelligence model of FIG. 3 in accordance with respective alternative embodiments of the present invention.

DESCRIPTION OF EXAMPLE EMBODIMENTS

Overview

Figure 1:
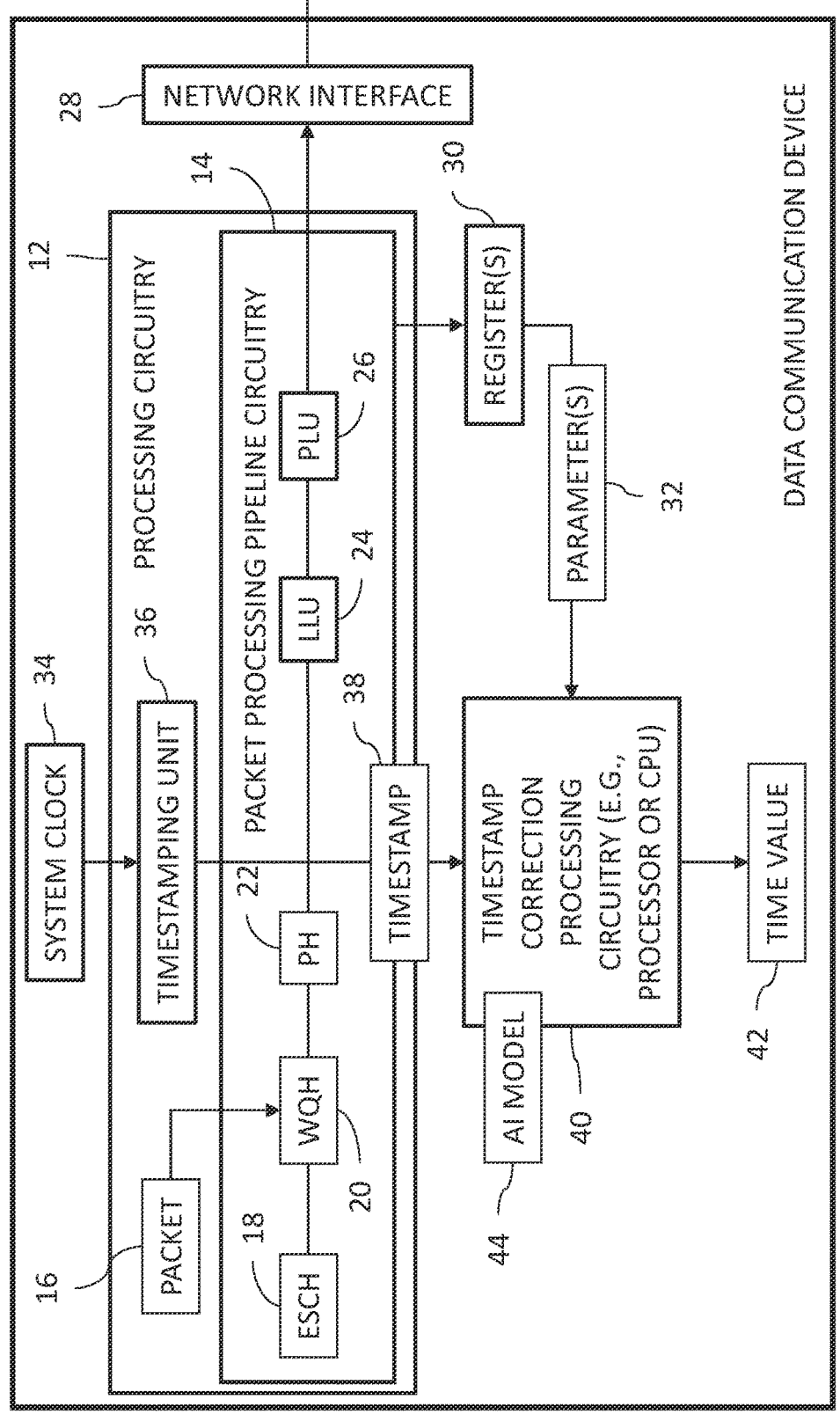
FIG. 1 is a block diagram view of data communication device constructed and operative in accordance with an embodiment of the present invention.

As Previously Mentioned, Many Applications, Such as Networking applications, rely on timestamping information (e.g., packet timestamping information provided by network interfaces) to indicate the timing of events. However, often the event of interest is not timestamped exactly when it occurs, but instead, the timestamp is generated "close" to the event, thus incurring some uncertainty as to when the event occurred.

Embodiments of the present invention solve the above problems by computing a time value as a correction to a timestamp generated for an event being processed by processing circuitry. The processing circuitry in operation uses one or more parameters, which are saved in one or more registers, and are indicative of a hardware state of the processing circuitry around (i.e., before, during, or after) the time of the event and are indicative of latency in the processing circuitry. The parameter(s) may therefore be used to provide a time value as a correction to the timestamp in order to adjust the timestamp to be closer to the actual time of the event.

In some embodiments, an artificial intelligence (AI) model may be trained to find a correlation between values of the parameter(s) and measured time differences between timestamp generation and corresponding estimated event times. The AI model may then be used to find the time value based on the parameter(s) as input. The AI model may be trained based on training data including: values of the parameter(s) stored in the register(s) of the processing circuitry around processing of the events; and measured time differences between timestamp generation and corresponding estimated event times. Disclosed embodiments describe various methods to collect the training data and perform the training. The AI model may include any one or more of the following: a decision tree; a random forest; linear regression; or a neural network.

In some embodiments, the trained AI model may indicate which parameter or parameters contribute the most to the AI model and are the most important. The most important parameter or parameters may be selected for use when applying the AI model to determine the time value. Different parameters may be selected for different event types.

In some embodiments, a function mapping the time value to different values of the parameter(s) may be found based on training data. For example, for a particular device it may be found that the time value is a function of queue occupancy. Other examples of suitable parameters are listed below.

In some embodiments, the event may be a packet being processed in a packet processing pipeline of a data communication apparatus. The packet event may include the packet being transmitted from, or arriving at, or processed in the packet processing pipeline. The timestamp of the event of the packet is generated at some point in the packet processing pipeline, and is later adjusted based on the computed time value. The time value is computed based on one or more packet processing pipeline parameters describing a hardware state of the packet processing pipeline around the packet event. The packet processing pipeline parameter(s) may include any one or more of the following: an occupancy of a queue; a size of a queue; average packet size; number of idle cycles; or a link speed; a number of credits from a host bus, a number of pause frames from the network; or any other suitable parameter which affects latency in the pipeline. The packet processing pipeline may include a link layer unit and a physical layer unit. The packet processing pipeline parameter(s) may be indicative of a hardware state of the link layer unit and/or the physical layer unit.

Some embodiments of the present invention improve hardware timestamp accuracy without replacing on modifying existing hardware. Other embodiments of the present invention improve hardware timestamping by replacing or modifying existing hardware implementations in next generation hardware.

System Description

Figure 2:
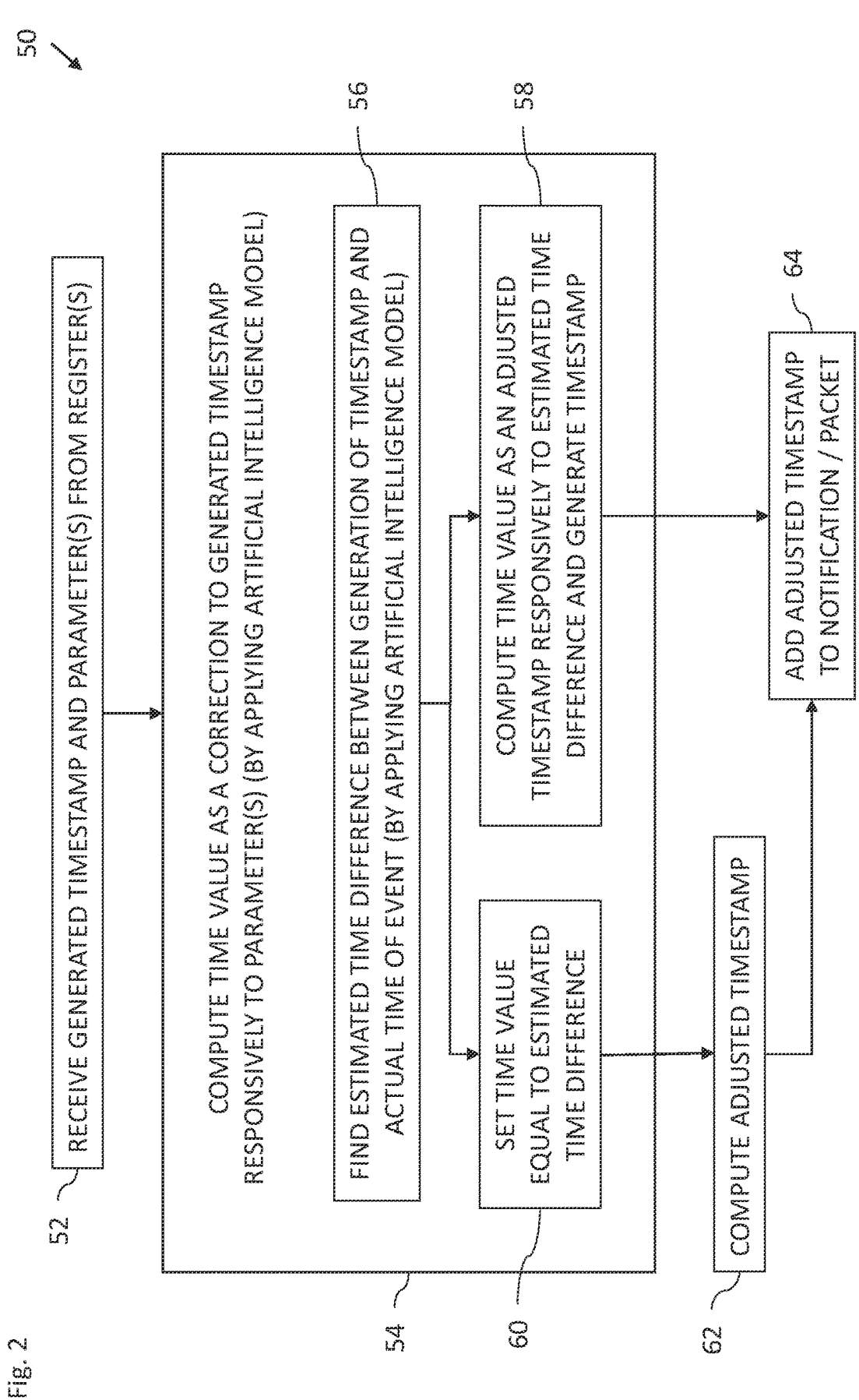
FIG. 2 is a flowchart including steps in a method of operation of the device of FIG. 1.

Reference is now made to FIG. 1, which is a block diagram view of data communication device 10 constructed and operative in accordance with an embodiment of the present invention. Reference is also made to FIG. 2, which is a flowchart 50 including steps in a method of operation of the device 10 of FIG. 1.

The data communication device 10 is described herein as a data communication device for sending and receiving data packets over a network (not shown). Embodiments of the present invention may be implemented with any suitable processing device, including one which is not sending and/or receiving data packets over a network.

The data communication device 10 includes processing circuitry 12 to process an event or events. The event may include any suitable event, for example, receiving a packet, sending a packet, processing a packet, or logging an event. The processing circuitry 12 may include packet processing pipeline circuitry 14 to process data packets including a data packet 16, wherein the event of the data packet 16 may include receiving, sending, or otherwise processing the data packet 16. The data packet 16 may be a clock synchronization packet, such as a Precision Time Protocol (PTP) or Network Time Protocol (NTP) clock synchronization packet. In the example of FIG. 1, the packet processing pipeline circuitry 14 is shown as being configured to process egress of the data packet 16 from the data communication device 10 to the network.

The packet processing pipeline circuitry 14 may include various hardware units to process egress or ingress of data packets. FIG. 1 shows that the packet processing pipeline circuitry 14 includes an event scheduler (ESCH) 18, a work queue handler (WQH) 20, a packet handler (PH) 22, a link layer unit 24, and a physical layer unit 26. The ESCH 18 schedules events, e.g., schedules the data packet 16 for egress. The WQH 20 manages queues and fetches the data packet 16 from memory (not shown). The PH 22 triggers the packet. The link layer unit 24 places the data packet 16 into relevant queues, and the physical layer unit 26 converts the data packet 16 to symbols for sending over the network.

In practice, some or all of the functions of the processing circuitry 12 and packet processing pipeline circuitry 14 may be combined in a single physical component or, alternatively, implemented using multiple physical components. These physical components may comprise hard-wired or programmable devices, or a combination of the two. In some embodiments, at least some of the functions of the processing circuitry 12 and packet processing pipeline circuitry 14 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The data communication device 10 also includes a network interface 28 configured to send data packets to, and receive data packets from a packet network (not shown).

The data communication device 10 also includes one or more registers 30 to store one or more parameters 32 describing a hardware state of the processing circuitry 12. The values of the parameter(s) 32 change as the hardware state of the processing circuitry 12 changes, so that during or around different events the values of the parameter(s) 32 may be different. In some embodiments, the parameter(s) 32 may include packet processing pipeline parameter(s) describing a state of the packet processing pipeline circuitry 14. In some embodiments, the packet processing pipeline parameter(s) is indicative of a state of the link layer unit 24 and/or the physical layer unit 26. The parameter(s) 32 may include any suitable parameters. The packet processing pipeline parameter(s) may include any suitable parameters, for example, one or more of the following: an occupancy of a queue; a size of a queue; average packet size; number of idle cycles; a number of credits from a host bus, a number of pause frames from the network; or a link speed.

The data communication device 10 also include a system clock 34 to provide a clock value, and a timestamping unit 36 to generate a timestamp 38 for the event (e.g., egress of the data packet 16, ingress of the data packet 16, or any other processing event of the data packet 16, or a logging event) responsively to the clock value generated by the system clock 34. The timestamp 38 may be generated at any suitable point in the processing circuitry 12 or in the packet processing pipeline circuitry 14. In some embodiments, the timestamping unit 36 is configured to generate the timestamp 38 before the data packet 16 is processed by the link layer unit 24, and after the data packet 16 has been processed by the PH 22, or at any other suitable point in the packet processing pipeline circuitry 14.

The generated timestamp 38 may be added to a data packet, e.g., the data packet 16, or sent back to a processor (e.g., central processing unit) such as a processor which generated the data packet 16 for adding to a notification for sending over the network to the same destination as the data packet 16.

The data communication device 10 also includes timestamp correction processing circuitry 40 (also referred to herein as processor 40 or CPU 40). The timestamp correction processing circuitry 40 is configured to receive (block 52) the timestamp 38 from the timestamping unit 36 and the parameter(s) 32 from the register(s) 30. The parameter(s) 32 may be retrieved or received by the timestamp correction processing circuitry 40 using various methods. In one method, firmware (software or fixed function circuitry) periodically queries the register(s) 30 and publishes the values of the parameter(s) 32 into a database with the times when the values of the parameter(s) 32 were queried. The timestamp correction processing circuitry 40 may then lookup values it will use from the database. For example, the timestamp correction processing circuitry 40 may look-up the values having a time closest to the timestamps that the timestamp correction processing circuitry 40 is tasked with adjusting. In a second method, the values of the parameter(s) 32 are published to a database which is not directly used by, and/or visible to, the timestamp correction processing circuitry 40. In this case, the timestamp correction processing circuitry 40 instructs firmware (software or fixed function circuitry) to lookup the desired values of the parameter(s) 32 in the database. In a third method, the packet processing pipeline circuitry 14 looks up the value(s) of the parameter(s) 32 in the register(s) 30 as it performs timestamping and adds the looked-up value to the data packet 16.

The timestamp correction processing circuitry 40 is configured to compute (block 54) a time value 42 as a correction (either an adjustment to the generated timestamp 38 or an adjusted timestamp) to the generated timestamp 38 responsively to the parameter(s) 32 stored in the register(s) 30. The parameter(s) 32 stored in the register(s) 30, and retrieved by the timestamp correction processing circuitry 40 to compute the time value 42, represent a hardware state of the processing circuitry 12 around processing of the event (e.g., egress or ingress of the data packet 16). The term "around" processing of the event, as used in the specification and claims, is defined as within a given threshold of the event, whether before, and/or during, and/or after the event. The given threshold may be defined as the same order of magnitude as the latency in the processing circuitry 12. For example, if the latency in the processing circuitry 12 is between 100 nanoseconds and 700 nanoseconds, the given threshold may be set at 700 nanoseconds. It will be noted that the more frequently the register(s) 30 are sampled, the time of retrieval of the parameter(s) 32 will be closer to the time of the event and may therefore be used to define the given threshold.

It should be noted that one or more parameters may be suitable for computing the time value for one type of event (e.g., egress of a packet), whereas one or more different parameters may be suitable for computing the time value for a different type of event (e.g., ingress of a packet or a logging event).

In some embodiments, the timestamp correction processing circuitry 40 is configured to compute the time value 42 as the correction to the generated timestamp 38 responsively to the packet processing pipeline parameter(s) stored in the register(s) 30. The packet processing pipeline parameter(s) stored in the register(s) 30, and retrieved by the timestamp correction processing circuitry 40 to compute the time value 42, represent a hardware state of the packet processing pipeline circuitry 14 around processing of the event.

In some embodiments, the timestamp correction processing circuitry 40 is configured to apply a trained artificial intelligence (AI) model 44 to the parameter(s) 32 retrieved from the register(s) 30 to yield the time value 42. The artificial intelligence model 44 may include any suitable AI model, for example any one or more of the following: a decision tree; a random forest; linear regression; or a neural network. Therefore, the timestamp correction processing circuitry 40 is configured to use the trained artificial intelligence model 44 to compute the time value 42 as a correction to the timestamp 38 generated for the event, which is being processed by processing circuitry 12, responsively to parameter(s) 32 describing the hardware state of the processing circuitry 12. In some embodiments, the timestamp correction processing circuitry 40 is configured to use the trained artificial intelligence model 44 to compute the time value 42 as the correction to the generated timestamp 38 responsively to the packet processing pipeline parameter(s) retrieved from the register(s) 30 and representing the hardware state of the packet processing pipeline circuitry 14.

The step of block 54 may include the sub-step of block 56 and the sub-steps of block 58 or 60 described below. The timestamp correction processing circuitry 40 may be configured to find (block 56) an estimated time difference between the generation of the timestamp 38 and an actual time of the event responsively to the parameter(s) 32. The timestamp correction processing circuitry 40 may be configured to compute (block 58) the time value 42 as an adjusted timestamp responsively to the estimated time difference and the generated timestamp 38.

In some embodiments, the timestamp correction processing circuitry 40 may be configured to find (block 56) an estimated time difference between the generation of the timestamp 38 and an actual time of the event responsively to the parameter(s) 32 and set (block 60) the time value 42 equal to the estimated time difference. In these embodiments, the timestamp correction processing circuitry 40 (or another suitable processor) is configured to compute (block 62) an adjusted timestamp responsively to the time value 42 and the generated timestamp 38.

The timestamp correction processing circuitry 40 (or another suitable processor) is configured to add (block 64) the adjusted timestamp to a notification or packet (e.g., for sending over the network to the same destination as the destination of the data packet 16) instead of using the timestamp 38.

In some embodiments, the timestamp correction processing circuitry 40 is configured to use the artificial intelligence model 44 to perform the step of block 58 to compute the time value 42 as an adjusted timestamp responsively to the parameter(s) 32 and the generated timestamp 38. In some embodiments, the timestamp correction processing circuitry 40 is configured to use the artificial intelligence model 44 to perform the steps of blocks 56 and 60 to compute the time value 42 as an estimated time difference between the generation of the timestamp 38 and an actual time of the event responsively to the parameter(s) 32.

In practice, some or all of the functions of the timestamp correction processing circuitry 40 may be combined in a single physical component or, alternatively, implemented using multiple physical components. These physical components may comprise hard-wired or programmable devices, or a combination of the two. In some embodiments, at least some of the functions of the timestamp correction processing circuitry 40 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
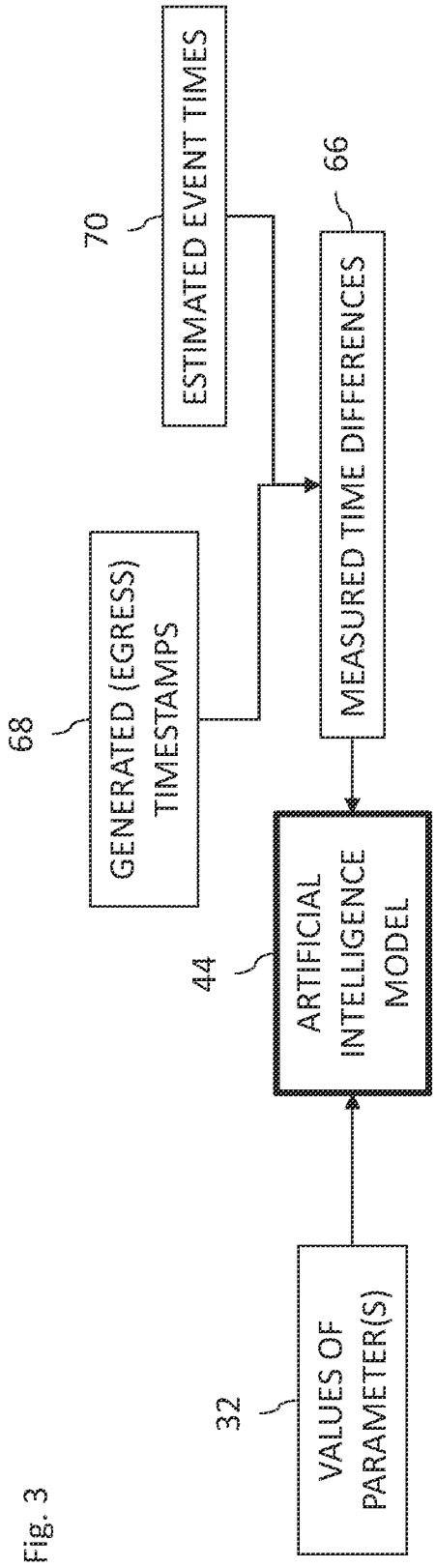
FIG. 3 is a schematic view illustrating training on an artificial intelligence model for use in the device of FIG. 1.

Reference is now made to FIG. 3, which is a schematic view illustrating training of the artificial intelligence model 44 for use in the data communication device 10 of FIG. 1. Reference is also made to FIG. 1.

The timestamp correction processing circuitry 40 is configured to train the artificial intelligence model 44 to compute the time value 42 as a correction to the timestamp 38 generated for the event, which is being processed by processing circuitry 12 (or by the packet processing pipeline circuitry 14), responsively to the parameter(s) 32 (e.g., the packet processing pipeline parameter(s)) describing the hardware state of the processing circuitry 12 or the packet processing pipeline circuitry 14 (around the processing of the event). In some embodiments, the timestamp correction processing circuitry 40 is configured to train the artificial intelligence model 44 to compute the time value 42 as an estimated time difference between the generation of the timestamp 38 and an actual time of the event (e.g., when the data packet 16 is egressed to the network from the data communication device 10) responsively to the parameter(s) 32. In some embodiments, the timestamp correction processing circuitry 40 is configured to train the artificial intelligence model 44 to compute the time value 42 as an adjusted timestamp responsively to the parameter(s) 32.

The timestamp correction processing circuitry 40 is configured to train the artificial intelligence model 44 responsively to respective values of the parameter(s) 32 and corresponding measured time differences 66 between the generation of respective timestamps (block 68) and respective estimated times of respective events (block 70). In other words, the artificial intelligence model 44 may be trained based on training data including the measured time differences 66 and corresponding parameter(s) 32 stored in the register(s) 30 around processing of the corresponding events (e.g., events 1 to n) so that the trained artificial intelligence model 44 may be applied to yield the time value 42 for an event A, in response to parameter(s) 32 stored in the register(s) 30 around the processing of the event A being input into the trained artificial intelligence model 44.

The artificial intelligence model 44 may need to be trained per device or per device type against may different factors which influence the latency in the processing circuitry 12 and/or the packet processing pipeline circuitry 14 yielding different values of the parameter(s) 32 and corresponding measured time differences 66. The factors may include applying different link speeds, network patterns (e.g., dynamic load and packet size), bandwidth, and other factors which change process time of the data packet 16 in the packet processing pipeline circuitry 14. Training data may be collected under different conditions, for example, different traffic (fluctuating and linear), different link speeds, and/or using random traffic patterns (optionally for different hardware states), etc.

Figure 4:
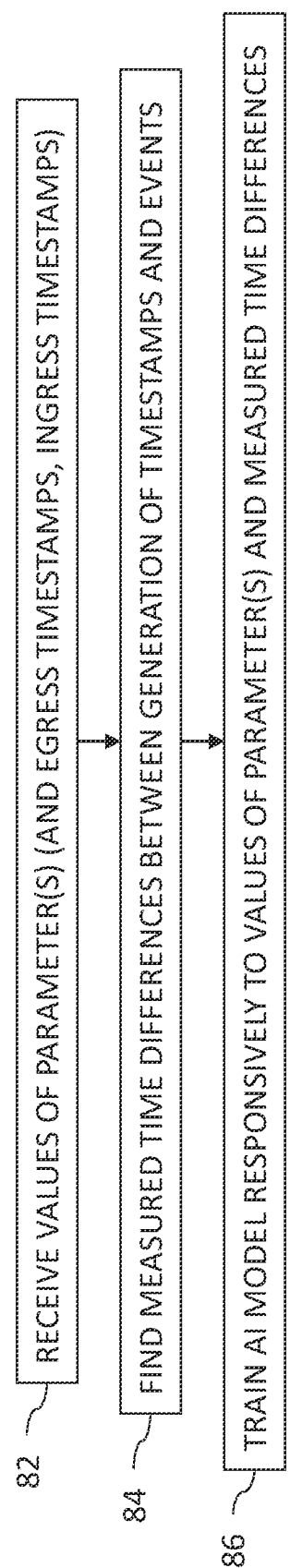
FIG. 4 is a flowchart including steps in a method to train the artificial intelligence model of FIG. 3.

Reference is now made to FIG. 4, which is a flowchart 80 including steps in a method to train the artificial intelligence model 44 of FIG. 3. Reference is also made to FIGS. 5A-D, which are alternative views of the data communication device 10 of FIG. 1 configured to produce training data for the artificial intelligence model 44 of FIG. 3 in accordance with respective alternative embodiments of the present invention.

In order to generate training data, when the event is a data packet leaving an egress port 46 of the network interface 28, respective packets 76 are generated (e.g., by a processor or CPU) for processing by the packet processing pipeline circuitry 14. The timestamping unit 36 is configured to generate egress timestamps 74 for the respective packets 76 prior to the respective packets 76 being processed by the link layer unit 24 (or at any suitable point in the packet processing pipeline circuitry 14) responsively to respective clock values of the system clock 34. In some embodiments, the system clock 34 may receive input from an oscillator 77 of the data communication device 10. The ESCH 18, WQH 20 and PH 22 are not shown in FIGS. 5A-E for the sake of simplicity. The register(s) 30 is configured to store respective values of parameter(s) 32 representing respective hardware states of the packet processing pipeline circuitry 14 around processing of the events of the respective packets 76. The egress timestamps 74 and the associated parameter(s) 32 are received by the timestamp correction processing circuitry 40.

A cable 48 (e.g., a copper cable or an optical cable with a fixed delay) is configured to connect the egress port 46 to a time measuring device 72 so that respective packets 76 leave the egress port 46 and enter the time measuring device 72 via the cable 48. The time measuring device 72 includes a clock 78 and generates ingress timestamps 75 for the respective packets 76 responsively to respective clock values of the clock 78. The ingress timestamps 75 are sent to the timestamp correction processing circuitry 40 (e.g., with the respective packets 76 or in notifications via the cable 48 or any other suitable connection).

Each packet 76 is associated with one of the egress timestamps 74, a corresponding one of the ingress timestamps 75, and a corresponding value or values of the parameter(s) 32. For any one of the packets 76, the event time (e.g., of egress of that packet 76 from the data communication device 10 to the network) may be estimated based on the ingress timestamp 75 of that packet 76 less the delay in the cable 48 and optionally less an estimated delay in the time measuring device 72 prior to generating the ingress timestamp 75. The delay in the cable 48 may be measured and assumed to be constant. Therefore, the event time for each of the respective packets 76 may be computed based on the corresponding ingress timestamps 75 less the measured delay in the cable 48. Alternatively, the measured time difference between generation of the egress timestamps 74 and corresponding event times for egress of the respective packets 76 may be computed based on the egress timestamps 74, the corresponding ingress timestamps 75, and the measured delay in the cable 48. The training data for the artificial intelligence model 44 therefore includes the value(s) of the parameter(s) 32 and corresponding measured time differences 66 for each of the respective packets 76.

The timestamp correction processing circuitry 40 is configured to receive (block 82) the values of the parameter(s) 32, the egress timestamps 74, and the ingress timestamps 75. The timestamp correction processing circuitry 40 is configured to find (block 84) the measured time differences 66 between the generation of respective egress timestamps 74 and the respective estimated times of the respective events responsively to: respective egress timestamps 74 of the respective data packets 76 leaving the egress port 46; respective ingress timestamps 75 of the respective data packets 76 entering the time measuring device 72; and the time delay in the cable 48. The timestamp correction processing circuitry 40 is configured to train (block 86) the artificial intelligence model 44 responsively to the training data including the respective values of the parameter(s) 32 and corresponding measured time differences 66 between the generation of respective timestamps 74 and respective estimated times of respective events.

Alternatively, the timestamp correction processing circuitry 40 is configured to train the artificial intelligence model 44 responsively to: respective values of the parameter(s) 32; respective egress timestamps 74 of the respective data packets 76 leaving the egress port 46; respective ingress timestamps 75 of the respective data packets 76 entering the time measuring device 72; and the time delay in the cable 48 (without first finding the measured time differences).

As the artificial intelligence model 44 is trained upon the difference between the egress timestamps 74 and the ingress timestamps 75, the system clock 34 and the clock 78 of the data communication device 10 and the time measuring device 72, respectively, are synchronized in order to ensure accurate training of the artificial intelligence model 44. Therefore, the processing circuitry 12 (or some other processor in the data communication device 10) and/or the time measuring device 72 is/are configured to process a clock synchronization between the system clock 34 of data communication device 10 and the clock 78 of time measuring device 72. Different methods of synchronizing the system clock 34 and the clock 78 are now described with reference to FIGS. 5A-D.

Figure 5A:
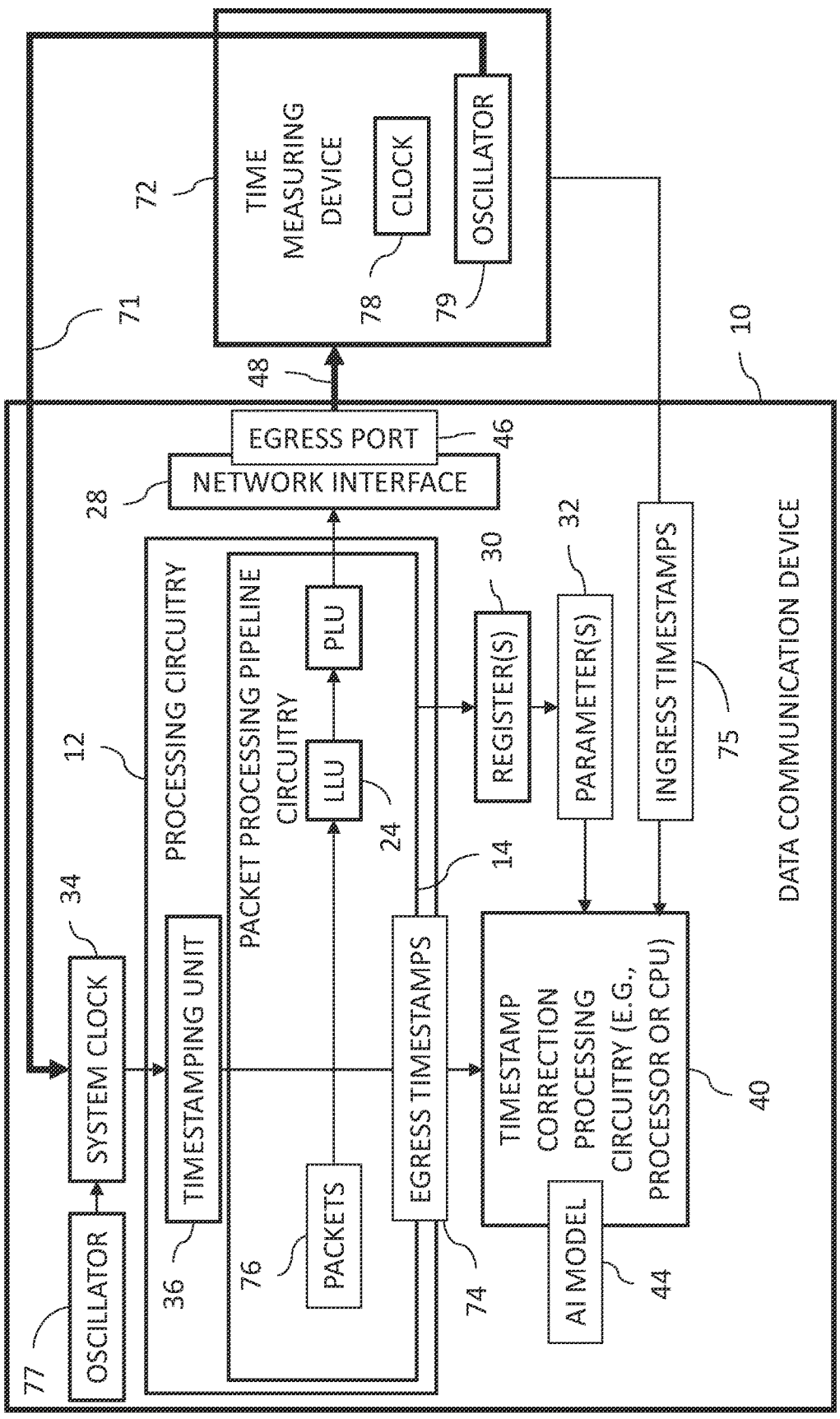

Reference is now made to FIG. 5A. The processing circuitry 12 is configured to synchronize the system clock 34 directly from an output of an oscillator 79 of the time measuring device 72 (using a suitable connection 71 between the time measuring device 72 and the data communication device 10), instead of using its own oscillator 77. In other words, the data communication device 10 and the time measuring device 72 use the same physical oscillator 79 to run their clocks 34, 78, thereby keeping the clocks 34, 78 synchronized. U.S. patent application Ser. No. 17/120,313 of Levi, et al., filed Dec. 14, 2020, which is hereby incorporated herein by reference, describes clock links which may be used to implement the connection 71.

Figure 5B:
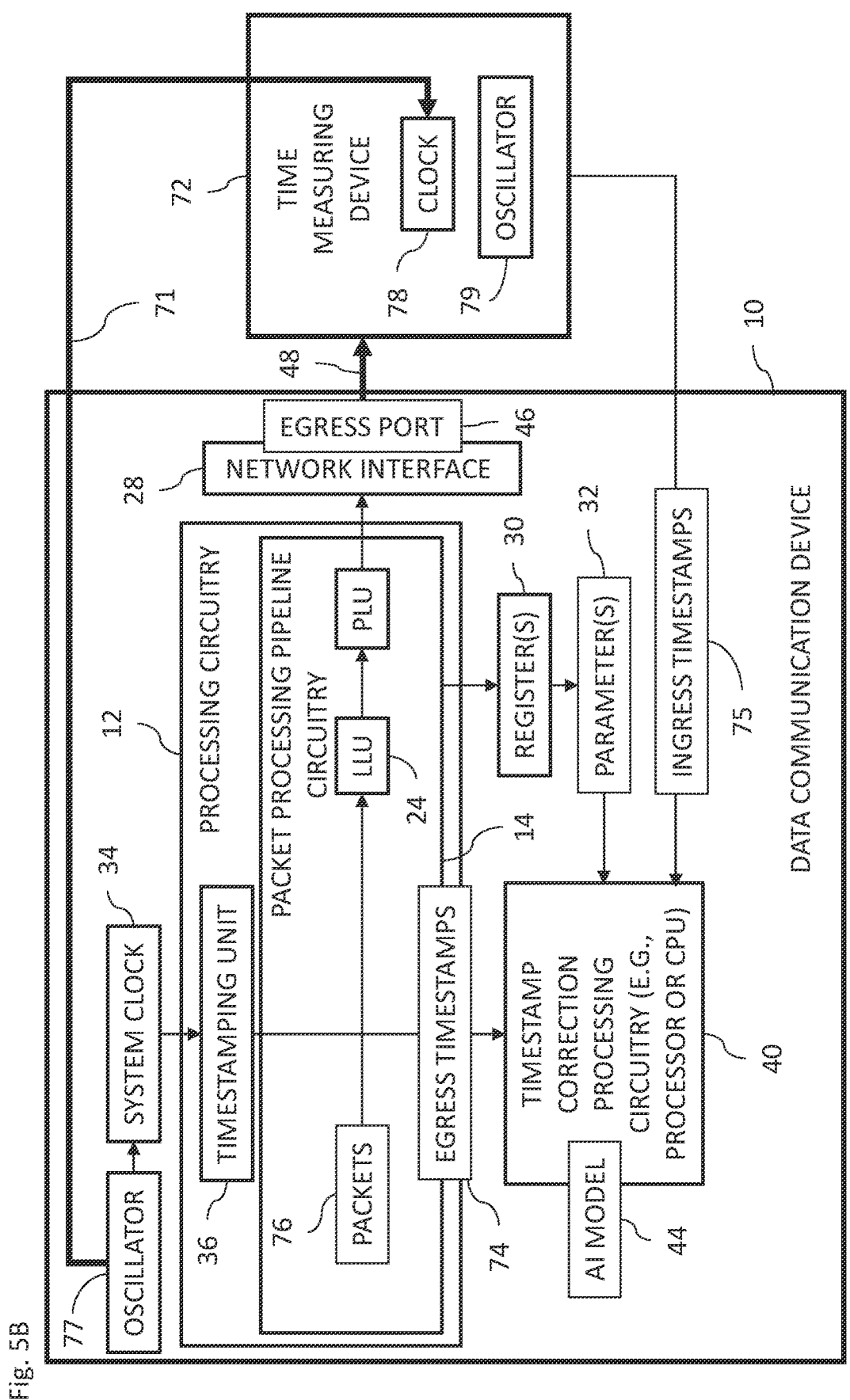

Reference is now made to FIG. 5B. The processing circuitry 12 is configured to provide an output of the oscillator 77 to the time measuring device 72 (via a suitable connection 71) to synchronize the clock 78 of the time measuring device 72 to the system clock 34 of the data communication device 10, instead of using the oscillator 79 of the time measuring device 72. In other words, the data communication device 10 and the time measuring device 72 use the same physical oscillator 77 to run their clocks 34, 78, thereby keeping the clocks 34, 78 synchronized.

Figure 5C:
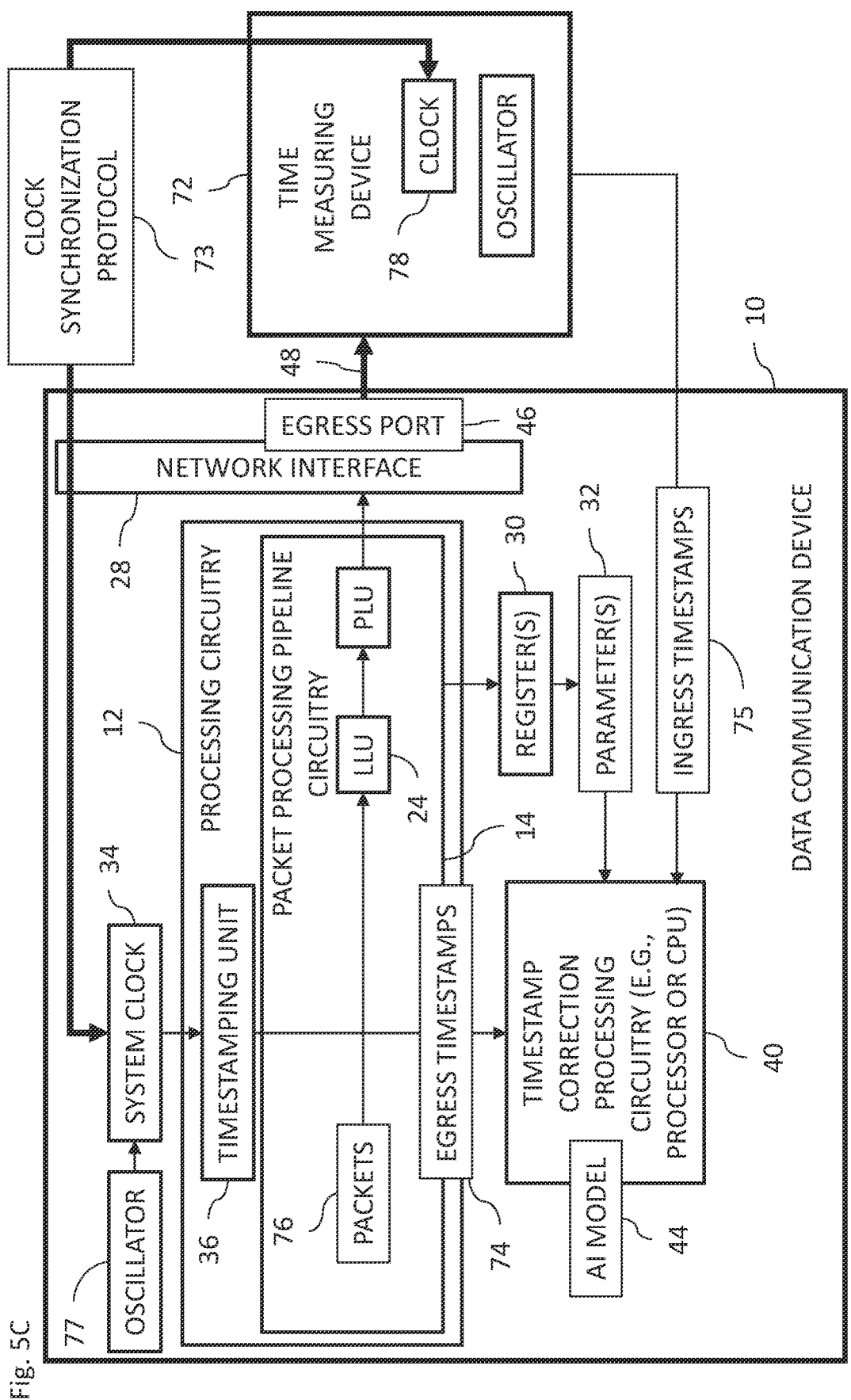

Reference is now made to FIG. 5C. The processing circuitry 12 is configured to process the clock synchronization responsively to applying a clock synchronization protocol 73 (e.g., Synchronous Ethernet (SyncE) or PTP) between the data communication device 10 and the time measuring device 72, thereby keeping the clocks 34, 78 synchronized.

Figure 5D:
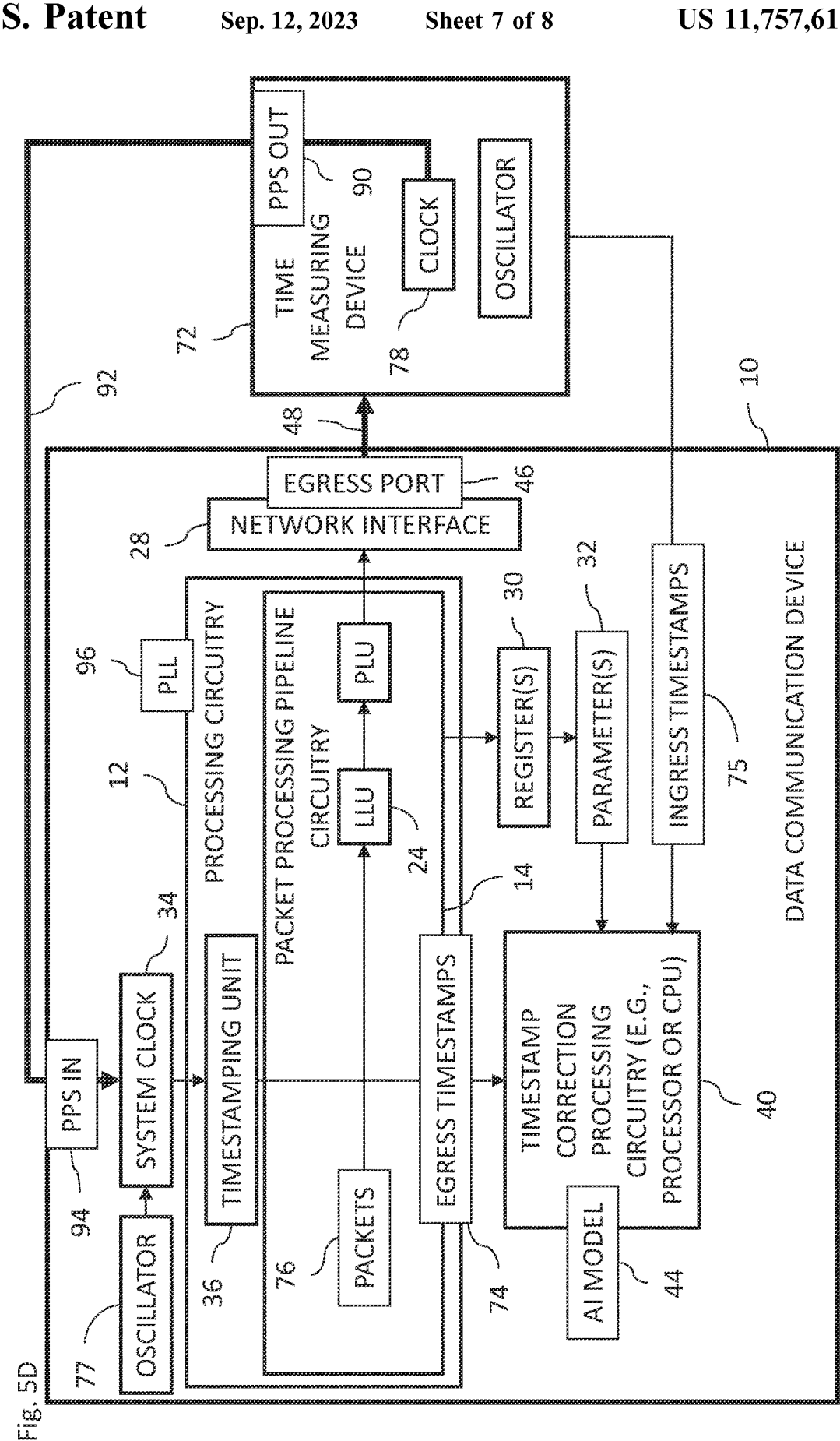

Reference is now made to FIG. 5D. FIG. 5D shows a PPS output 90 of the time measuring device 72 connected to a PPS input 94 of the data communication device 10 via cable 92. The processing circuitry 12 (which may comprise a phase-locked-loop 96) is configured to process the clock synchronization responsively to the phase-locked-loop 96, which is configured to track the PPS output 90 of the clock 78 of the time measuring device 72. In some embodiments, the time measuring device 72 is configured to process the clock synchronization responsively to a phase-locked-loop (in the time measuring device 72), which is configured to track a PPS output of the clock 34 of the data communication device 10.

In the embodiments described above with reference to FIGS. 5A-D the clocks of the data communication device 10 and the time measuring device 72 are synchronized. In the embodiment described with reference to FIG. 5E, there is no need to perform a clock synchronization as will now be described in more detail.

Reference is now made to FIG. 5E, which is a block diagram view of the data communication device 10 of FIG. 1 configured to produce training data for the artificial intelligence model 44 of FIG. 3 in accordance an alternative embodiment of the present invention. The egress port 46 is connected to another port of the network interface 28 configured as an ingress port 98 via the cable 48 so that the respective packets 76 leave the egress port 46 and enter the ingress port 98 via the cable 48. The data communication device 10 also includes a packet processing pipeline 100 to process ingress of the respective packets 76 from the cable 48 including generating the ingress timestamps 75 for the respective packets 76. The timestamping unit 36 is configured to generate the respective egress timestamps 74 and the respective ingress timestamps 75 responsively to respective clock values of the system clock 34 of the data communication device 10. Therefore, there is no need for clock synchronization as the clock values of a common clock are used for generating both egress timestamps 74 and the ingress timestamps 75.

The timestamp correction processing circuitry 40 is configured to train the artificial intelligence model 44 responsively to the egress timestamps 74, ingress timestamps 75, delay in the cable 48, and the corresponding values of the parameter(s) 32 (stored in the register(s) 30) as described above with reference to FIGS. 5A-D and steps of blocks 82-86 described with reference to FIG. 4.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A processing apparatus, comprising:
a network interface to send data packets to, and receive data packets from a packet network;
processing circuitry to process an event, and comprising packet processing pipeline circuitry to process a data packet;
a timestamping unit to generate a timestamp for the event and the data packet;
at least one register to store at least one parameter describing a hardware state of the processing circuitry, the at least one parameter being at least one packet processing pipeline parameter describing a state of the packet processing pipeline circuitry; and timestamp correction processing circuitry to: compute a time value as a correction to the generated timestamp responsively to the at least one packet processing pipeline parameter.

2. The apparatus according to claim 1, wherein the hardware state of the processing circuitry is a hardware state of the processing circuitry around processing of the event.

3. The apparatus according to claim 1, wherein the hardware state of the processing circuitry is a hardware state of the processing circuitry during processing of the event.

4. The apparatus according to claim 1, wherein the packet processing pipeline circuitry is configured to process egress of the data packet from the apparatus.

5. The apparatus according to claim 1, wherein the at least one packet processing pipeline parameter includes any one or more of the following: an occupancy of a queue; a size of a queue; average packet size; number of idle cycles; a number of credits from a host bus, a number of pause frames from the network; or a link speed.

6. The apparatus according to claim 1, wherein the packet processing pipeline circuitry includes a link layer unit and a physical layer unit, the at least one packet processing pipeline parameter describing a state of at least one of: the link layer unit; or the physical layer unit.

7. The apparatus according to claim 1, wherein the data packet is a clock synchronization packet.

8. A processing apparatus, comprising:
processing circuitry to process an event;
a timestamping unit to generate a timestamp for the event;
at least one register to store at least one parameter describing a hardware state of the processing circuitry; and
timestamp correction processing circuitry to:
compute a time value as a correction to the generated timestamp responsively to the at least one parameter;
find an estimated time difference between the generation of the timestamp and an actual time of the event responsively to the at least one parameter; and
set the time value equal to the estimated time difference; or compute the time value as an adjusted timestamp responsively to the estimated time difference and the generated timestamp.

9. The apparatus according to claim 8, wherein the timestamp correction processing circuitry is configured to compute the time value as the adjusted timestamp responsively to the estimated time difference and the generated timestamp.

10. The apparatus according to claim 8, wherein the timestamp correction processing circuitry is configured to set the time value is equal to the estimated time difference.

11. The apparatus according to claim 1, wherein the timestamp correction processing circuitry is configured to apply an artificial intelligence model to the at least one parameter to yield the time value.

12. The apparatus according to claim 11, wherein the artificial intelligence model includes any one or more of the following: a decision tree; a random forest; linear regression; or a neural network.

13. The apparatus according to claim 11, further comprising a processor to train the artificial intelligence model responsively to respective values of the at least one parameter and corresponding measured time differences between the generation of respective timestamps and respective estimated times of respective events.

14. The apparatus according to claim 13, wherein:
the network interface includes a port configured as an egress port;

the apparatus further comprises a cable configured to connect the egress port to a time measuring device so that the respective packets leave the egress port and enter the time measuring device via the cable
the respective events are respective data packets leaving the egress port; and
the processor is configured to find the measured time differences between the generation of respective timestamps and the respective estimated times of the respective events responsively to: respective egress timestamps of the respective data packets leaving the egress port; respective ingress timestamps of the respective data packets entering the time measuring device; and a time delay in the cable.

15. The apparatus according to claim 14, further comprising a system clock, and wherein the processing circuitry is configured to process a clock synchronization between the system clock and a clock of the time measuring device.

16. The apparatus according to claim 15, wherein the processing circuitry is configured to synchronize the system clock directly from an output of an oscillator of the time measuring device.

17. The apparatus according to claim 15, further comprising an oscillator, wherein the processing circuitry is configured to provide an output of the oscillator to the time measuring device to synchronize the clock of the time measuring device to the system clock.

18. The apparatus according to claim 15, wherein the processing circuitry is configured to process the clock synchronization responsively to applying a clock synchronization protocol between the apparatus and the time measuring device.

19. The apparatus according to claim 15, wherein the processing circuitry is configured to process the clock synchronization responsively to a phase-locked-loop, which is configured to track a PPS output of the system clock or the clock of the time measuring device.

20. The apparatus according to claim 14, further comprising a system clock, and wherein:
the network interface includes another port configured as an ingress port;
the cable is configured to connect the egress port to the ingress port so that the respective packets leave the egress port and enter the ingress port via the cable; and
the timestamping unit is configured to generate the respective egress timestamps and respective ingress timestamps responsively to respective values of the system clock.

21. A processing apparatus, comprising a processor to train an artificial intelligence model to compute a time value as a correction to a timestamp generated for an event, which is being processed by processing circuitry, responsively to at least one parameter describing a hardware state of the processing circuitry, wherein the processor is to train the artificial intelligence model responsively to respective values of the at least one parameter and corresponding measured time differences between the generation of respective timestamps and respective estimated times of respective events.

22. The apparatus according to claim 21, wherein the hardware state of the processing circuitry is a hardware state of the processing circuitry around processing of the event.

23. The apparatus according to claim 21, wherein the hardware state of the processing circuitry is a hardware state of the processing circuitry during processing of the event.

24. The apparatus according to claim 21, wherein the at least one parameter is at least one packet processing pipeline parameter.

25. The apparatus according to claim 24, wherein the at least one packet processing pipeline parameter includes any one or more of the following: an occupancy of a queue; a size of a queue; average packet size; number of idle cycles; a number of credits from a host bus, a number of pause frames from the network; or a link speed.

26. The apparatus according to claim 24, wherein the at least one packet processing pipeline parameter describing a state of at least one of a link layer unit or a physical layer unit of a packet processing pipeline.

27. The apparatus according to claim 21, wherein the artificial intelligence model includes any one or more of the following: a decision tree; a random forest; linear regression; or a neural network.

28. The apparatus according to claim 21, further comprising:
a network interface to send data packets to, and receive data packets from, a packet network, the network interface including a port configured as an egress port; and
a cable configured to connect the egress port to a time measuring device so that the respective packets leave the egress port and enter the time measuring device via the cable, and wherein:
the respective events are respective data packets leaving the egress port; and
the processor is configured to train the artificial intelligence model responsively to: respective values of the at least one parameter; respective egress timestamps of the respective data packets leaving the egress port; respective ingress timestamps of the respective data packets entering the time measuring device; and a time delay in the cable.

29. The apparatus according to claim 28, further comprising a system clock; and the processing circuitry, which is configured to process a clock synchronization between the system clock and a clock of the time measuring device.

30. The apparatus according to claim 28, further comprising a system clock and a timestamping unit, and wherein:
the network interface includes another port configured as an ingress port;
the cable is configured to connect the egress port to the ingress port so that the respective packets leave the egress port and enter the ingress port via the cable; and
the timestamping unit is configured to generate the respective egress timestamps and respective ingress timestamps responsively to respective values of the system clock.

31. A processing apparatus, comprising:
a processor to use a trained artificial intelligence model to compute a time value as a correction to a timestamp generated for an event, which is being processed by processing circuitry, responsively to at least one parameter describing a hardware state of the processing circuitry;
a network interface to send data packets to, and receive data packets from a packet network;
the processing circuitry, which comprises packet processing pipeline circuitry to process a data packet;
a timestamping unit to generate the timestamp for the data packet, and wherein:
the at least one parameter is at least one packet processing pipeline parameter describing a state of the packet processing pipeline circuitry; and
the processor is configured to use the trained artificial intelligence model to compute the time value as the correction to the generated timestamp responsively to the at least one packet processing pipeline parameter.

32. The apparatus according to claim 31, wherein the hardware state of the processing circuitry is a hardware state of the processing circuitry around processing of the event.

33. The apparatus according to claim 31, wherein the at least one packet processing pipeline parameter includes any one or more of the following: an occupancy of a queue; a size of a queue; average packet size; number of idle cycles; a number of credits from a host bus, a number of pause frames from the network; or a link speed.

34. The apparatus according to claim 31, wherein the packet processing pipeline circuitry includes a link layer unit and a physical layer unit, the at least one packet processing pipeline parameter describing a state of at least one of: the link layer unit; or the physical layer unit.

35. The apparatus according to claim 31, wherein the artificial intelligence model includes any one or more of the following: a decision tree; a random forest; linear regression; or a neural network.

* * * * *